(12) United States Patent
Panga et al.

(10) Patent No.: US 11,530,349 B2
(45) Date of Patent: *Dec. 20, 2022

(54) METHODS OF CONTROLLING VISCOSITY OF ACIDS

(71) Applicant: Schlumberger Technology Corporation, Sugar Land, TX (US)

(72) Inventors: Mohan Kanaka Raju Panga, Sugar Land, TX (US); Philippe Enkababian, Richmond, TX (US); Christopher Daeffler, Houston, TX (US); Tausif Khizar Ahmed, Doha (QA); Kong Teng Ling, Kuala Lumpur (MY)

(73) Assignee: Schlumberger Technology Corporation, Sugar Land, TX (US)

(*) Notice: Subject to any disclaimer, the term of this patent is extended or adjusted under 35 U.S.C. 154(b) by 250 days.

This patent is subject to a terminal disclaimer.

(21) Appl. No.: 16/018,385

(22) Filed: Jun. 26, 2018

(65) Prior Publication Data

US 2019/0062621 A1    Feb. 28, 2019

Related U.S. Application Data

(60) Provisional application No. 62/524,959, filed on Jun. 26, 2017.

(51) Int. Cl.
*C09K 8/74* (2006.01)
*C09K 8/60* (2006.01)
*E21B 43/26* (2006.01)
*C09K 8/72* (2006.01)
*C09K 8/54* (2006.01)

(52) U.S. Cl.
CPC ............ *C09K 8/74* (2013.01); *C09K 8/602* (2013.01); *C09K 8/725* (2013.01); *E21B 43/26* (2013.01); *C09K 8/54* (2013.01); *C09K 2208/30* (2013.01); *C09K 2208/32* (2013.01)

(58) Field of Classification Search
None
See application file for complete search history.

(56) References Cited

U.S. PATENT DOCUMENTS

| 7,237,608 | B2 * | 7/2007 | Fu ........................ C09K 8/602 166/279 |
| 7,279,446 | B2 * | 10/2007 | Colaco .................. C09K 8/584 507/119 |
| 7,299,870 | B2 * | 11/2007 | Garcia-Lopez De Victoria .......... C09K 8/602 166/279 |
| 7,306,041 | B2 * | 12/2007 | Milne ..................... C09K 8/74 166/263 |

(Continued)

*Primary Examiner* — Anuradha Ahuja

(57) ABSTRACT

A method is described for treating a subterranean formation penetrated by a wellbore including injecting into the formation a treatment fluid including a rheological modifier; at least one viscoelastic surfactant (VES) at a concentration of between about 0.1 and about 10 percent by weight; and a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts thereof and mixtures of said acids and salts.

11 Claims, 3 Drawing Sheets

(56) References Cited

U.S. PATENT DOCUMENTS

| | | | | |
|---|---|---|---|---|
| 7,345,012 | B2* | 3/2008 | Chen | C09K 8/703 |
| | | | | 166/270.1 |
| 7,378,378 | B2* | 5/2008 | Chen | C09K 8/68 |
| | | | | 166/308.2 |
| 7,387,986 | B2* | 6/2008 | Chen | C09K 8/602 |
| | | | | 166/308.1 |
| 7,387,987 | B2* | 6/2008 | Chen | C09K 8/68 |
| | | | | 166/308.2 |
| 7,402,549 | B2* | 7/2008 | Chen | C09K 8/602 |
| | | | | 166/308.1 |
| 7,507,693 | B2* | 3/2009 | Chen | C09K 8/602 |
| | | | | 166/308.2 |
| 7,575,054 | B2* | 8/2009 | Fuller | C09K 8/602 |
| | | | | 166/281 |
| 7,770,644 | B2* | 8/2010 | Fu | C09K 8/602 |
| | | | | 166/279 |
| 8,895,481 | B2* | 11/2014 | Chen | C09K 8/74 |
| | | | | 166/308.1 |
| 2006/0081370 | A1* | 4/2006 | Fu | C09K 8/602 |
| | | | | 166/279 |
| 2006/0128598 | A1* | 6/2006 | Chen | C09K 8/602 |
| | | | | 510/490 |
| 2011/0053812 | A1* | 3/2011 | Ezell | C09K 8/602 |
| | | | | 507/219 |
| 2018/0244981 | A1* | 8/2018 | Panga | C09K 8/74 |
| 2018/0244982 | A1* | 8/2018 | Yakovlev | E21B 43/26 |

\* cited by examiner

METHODS OF CONTROLLING VISCOSITY OF ACIDS

The present application claims priority to U.S. Provisional Application Ser. No. 62/524,959 filed Jun. 26, 2017, which is incorporated herein by reference in its entiret.

BACKGROUND

The present disclosure generally relates to an acidic fluid that may increase in viscosity as it is pumped into a subterranean formation. More specifically, it relates to a fluid system containing a viscoelastic surfactant and a concentration of acid that does not allow the fluid to gel within a permeable subterranean formation. Most particularly it relates to a method of treating a subterranean formation with such a fluid system.

SUMMARY

In one aspect, embodiments disclosed herein relate to a method of treating a subterranean formation penetrated by a wellbore including injecting a low-viscosity treatment fluid into the formation; the treatment fluid contains a viscoelastic surfactant and a formation dissolving agent. The viscoelastic surfactant in the treatment fluid gels as the formation dissolving agent reacts with the subterranean formation. Another embodiment is a method of treating a subterranean formation penetrated by a wellbore with a low-viscosity treatment fluid into the formation; the treatment fluid contains a viscoelastic surfactant and a formation dissolving agent and a rheology modifier. The rheology modifier changes the viscosity of the treatment fluid as a function of the extent of reaction between the formation dissolving agent and the formation. The concentration of the viscoelastic surfactant is typically between about 0.1 and about 10 percent, for example between about 0.9 and about 3 percent. The concentration of the rheology modifier is typically between 0.01 and about 3 percent, for example between about 0.1 and 1 percent. Examples of the treatment method include matrix acidizing, acid fracturing, diversion, loss circulation control and mud cake removal.

In another aspect, embodiments disclosed herein relate to a viscoelastic surfactant system that includes a zwitterionic surfactant, for example a surfactant having the structure:

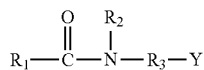

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment, the zwitterionic surfactant has the betaine structure:

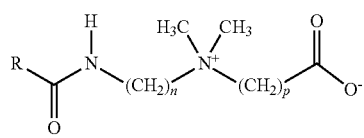

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may be used. Exemplary embodiments of such betaines include those in which R is $C_{17}H_{33}$ or $C_{21}H_{41}$, and n=3 and p=1.

In yet another embodiment, the formation dissolving agent is a mineral acid, organic acid, chelant or a combination thereof.

In yet another embodiment, the rheology modifier is a corrosion inhibitor, a surfactant or a polymer, or a combination thereof.

The corrosion inhibitor can include a polymerizable monomer, an alkynyl alcohol, aliphatic polyglycol, cinnamaldehyde, potassium iodide, copper chloride, copper iodide, antimony chloride or a mixture thereof.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present invention is further described in the Detailed Description which follows, in reference to the Drawings by way of non-limiting examples of exemplary embodiments of the present disclosure, in which like reference numerals represent similar parts throughout the several views of the drawings, and wherein.

DETAILED DESCRIPTION

Figure 1:
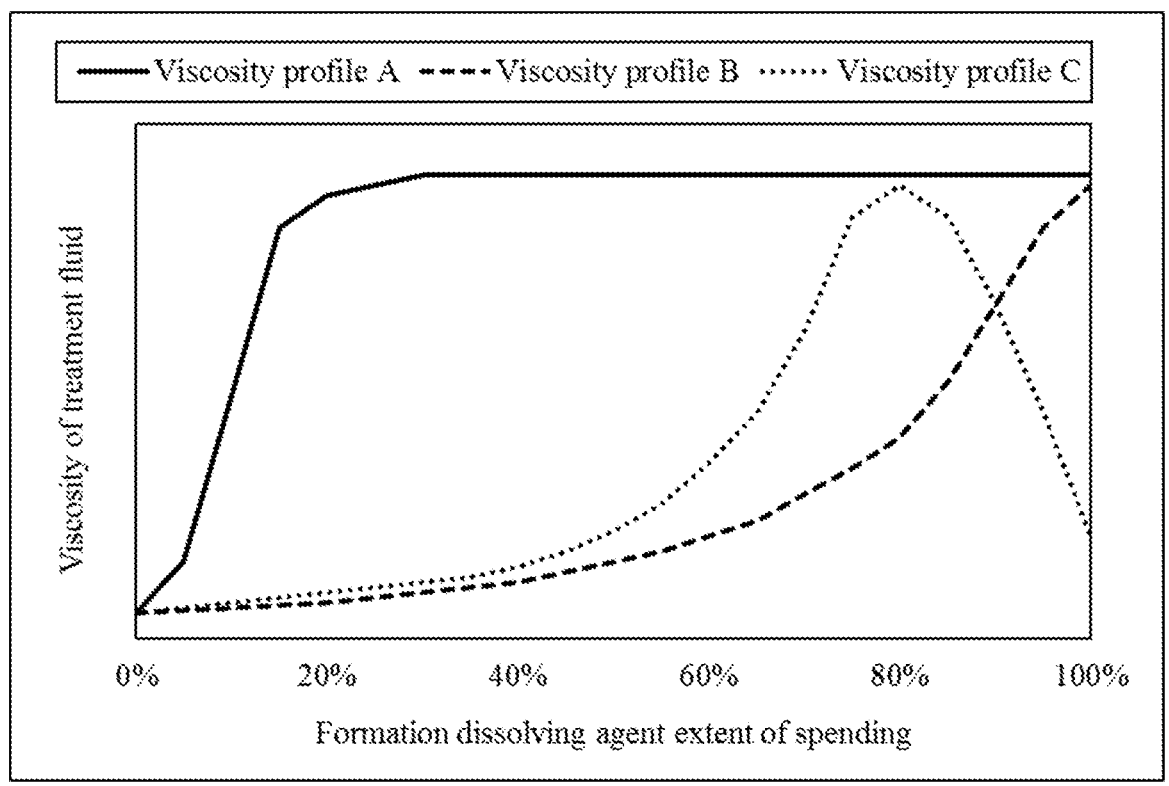
FIG. 1 illustrates the effect of a formation dissolving agent on fluid properties, in accordance with embodiments of the present disclosure.

Embodiments of the present disclosure relate to the treatment of subterranean formations with viscosifying fluids. Specifically, the present disclosure relates to a treatment fluid comprising a viscoelastic surfactant, a formation dissolving agent and rheology modifier, and the application thereof to a subterranean formation.

Acid stimulation is a technique widely used to increase production of oil and gas from carbonate reservoirs. The injected acid dissolves the minerals in the formation and creates conductive flow channels known as wormholes that facilitate production. When reservoirs with different zones of permeability are treated with acid, the acid flows into the high permeability zones and does not stimulate the low permeability zones. To stimulate the low permeability zones, it is necessary to divert the acid from high to low permeability zones. Similarly, when long enough intervals are treated with acid, diversion is needed to prevent a heterogeneous injection profile from resulting. One of the methods used to divert acid involves mixing a viscoelastic surfactant with the acid prior to injection of the acid into the formation. (A "viscoelastic" surfactant is a surfactant that under certain conditions can impart viscoelasticity to a fluid.) The viscosity of certain mixtures of acid and VES depends on the concentration of acid; the viscosity of the mixture is low when it is strongly acidic and the viscosity increases as the acid spends in the formation. This increase in viscosity causes increased resistance to flow in the high permeability zone, leading to a build-up of pressure that helps in diverting the flow to lower permeability zones. In this use, such fluids are called viscoelastic diverting acids, or VDA's. Similarly, in acid fracturing, the growing fracture may encounter or create high-permeability regions through which acid, which is incorporated in the fluid so that it can etch the fracture faces, leaks off into the formation. Avoiding, or at least minimizing, this loss of acid is called leakoff control. At best, this is inefficient and wasteful of acid; at worst, this may reduce or eliminate fracture growth. The same compositions and methods that are used for diversion in matrix treatments may be used for leakoff control in fracturing treatments. An example includes U.S. Pat. No. 7,237,608, which is incorporated in its entirety herein by reference.

It should be understood that any fluid that dissolves at least portions of a given formation may be used to stimulate or fracture the formation. Normally mineral acids are used and the treatments are called acidizing or acid fracturing. Organic acids may also be used. Other formation-dissolving agents may be used, for example chelating agents for the appropriate minerals, for example aminopolycarboxylic acids or polyaminopolycarboxylic acids. Except when we name specific acids, we intend the term "acid" to include other formation-dissolving agents. The formation-dissolving agents may comprise hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts thereof and mixtures of said acids and salts The viscosity of the treatment fluid is dependent on the extent of reaction between the formation dissolving agent and the subterranean formation, often termed "spending". For example, "25% spent" means that 25% of the formation dissolving agent initially present in the treatment fluid has reacted with the subterranean formation. The reaction between the formation dissolving agent and subterranean formation will continue until the formation dissolving agent is 100% spent. During this process, the viscosity of the treatment fluid is changing.

It is advantageous to be able to control the viscosity of the treatment fluid during the process where the formation dissolving agent reacts with the subterranean formation. In the case where the treatment fluid is employed in an acid fracturing operation, it is preferred that the viscosity of the treatment fluid increases rapidly as the formation dissolving agent reacts with the subterranean formation (FIG. 1, viscosity profile A). The high viscosity of the treatment fluid with low extent of spending will prevent leakoff of fluid into the formation and promote fracture extension. In the case of a matrix acidizing operation, the treatment fluid should develop high viscosity only at a high extent of spending. The low viscosity of the fluid at low extent of spending will allow it to enter the porous matrix of the subterranean formation and create viscous plugs in the pores (FIG. 1, viscosity profile B). In some cases it is also desired that the viscosity of the treatment fluid decreases at high extent of spending. The low viscosity of the spent treatment fluid remaining in the subterranean formation after the wellsite operation will allow for easier displacement by natural formation fluids as they flow from the subterranean formation into the wellbore (FIG. 1, viscosity profile C). This behavior may be achieved by the addition of a rheology modifier. The rheology modifier may be a surfactant, polymer or a corrosion inhibitor or a combination thereof. The surfactant may be anionic, cationic or nonionic, or a mixture thereof. The polymer may comprise polyacrylamide, polystyrene, polysiloxane, poly(vinylalcohol), guar or functionalized guar derivative, cellulose or a mixture thereof. The corrosion inhibitor may be a quaternary ammonium salt, a polymerizable monomer, an alkynyl alcohol, aliphatic polyglycol, cinnamaldehyde, potassium iodide, copper chloride, copper iodide, antimony chloride or a mixture thereof.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Examples

The viscosity of treatment fluid formulations was measured at various amount of extent spending of the formation dissolving agent. The formation dissolving agent in this case was hydrochloric acid (HCl). Powdered calcium carbonate was used as a mimic for a limestone subterranean formation. Table 1 describes the formulation of the three treatment fluids studied in this example. Corrosion inhibitor #1 contains an aliphatic polyglycol ether and a metal salt. Corrosion inhibitor #2 contains a quaternary amine salt, a polymerizable component and formic acid. The viscosity of the treatment fluid was measured by a Fann 35 viscometer at 170 $s^{-1}$.

Figure 2:
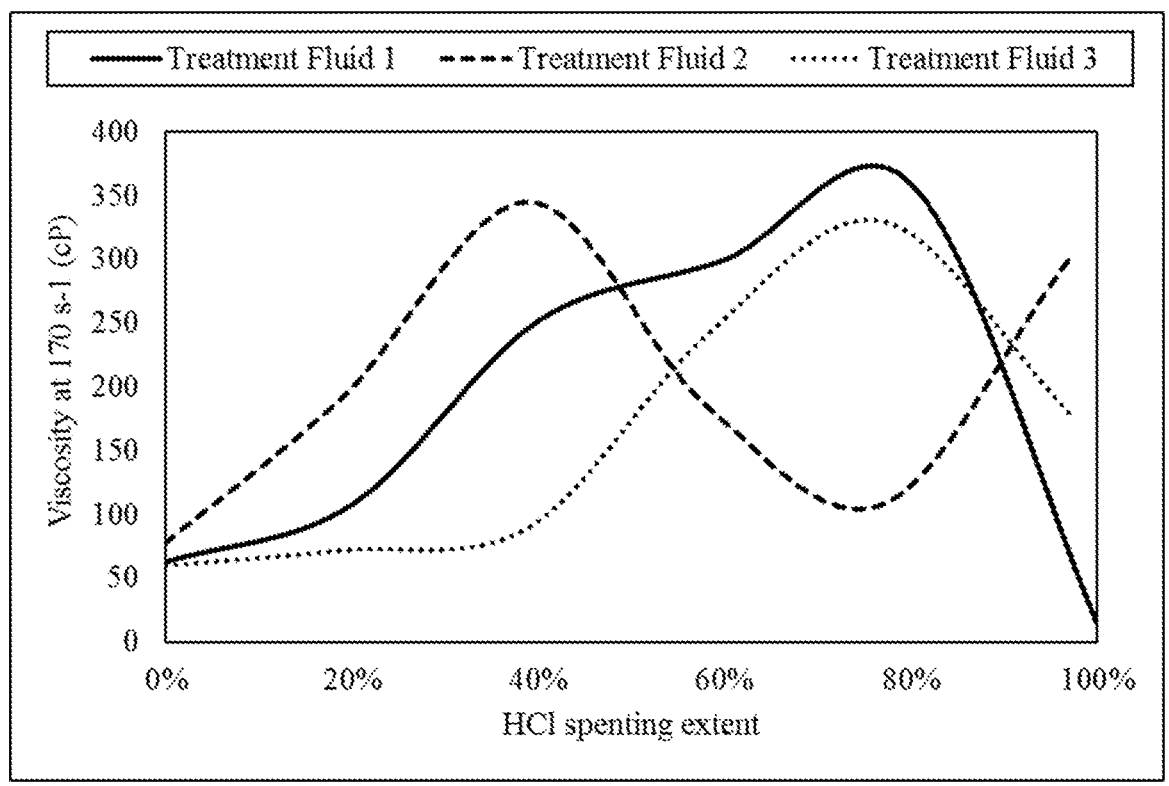
FIG. 2 illustrates the effect of varying additives on the spending profile of viscoelastic treatment fluids, in accordance with embodiments of the present disclosure.

The viscosity results in FIG. 2 showed that the spending profile of the viscoelastic treatment fluid can be controlled as desired by different additives. Treatment fluid 1 is the baseline response of the viscoelastic surfactant when the formation dissolving agent reacts with the formation. The profile shows late development of high viscosity and low final viscosity. Treatment fluid 2 contains corrosion inhibitor #1, which changes the spending profile substantially. High viscosity is now achieved at low extent of spending, and the viscosity at 100% spending is high. Treatment fluid contains corrosion inhibitor #2 and possesses a still different viscosity profile with late development of high viscosity and high viscosity at 100% spending.

TABLE 1

| Additive | Treatment fluid 1 | Treatment fluid 2 | Treatment fluid 3 |
| --- | --- | --- | --- |
| Hydrochloric acid | 18 | 18 | 18 |
| Viscoelastic surfactant | 2.9 | 2.9 | 2.9 |
| Methanol | 0.8 | 0.8 | 0.8 |

TABLE 1-continued

| Additive | Treatment fluid 1 | Treatment fluid 2 | Treatment fluid 3 |
|---|---|---|---|
| Isopropanol | 1.7 | 1.7 | 1.7 |
| Corrosion inhibitor #1 | | 1.1 | |
| Corrosion inhibitors #2 | | | 2.8 |

All values are weight percent of the total fluid. The balance of the treatment fluid is water.

Figure 3:
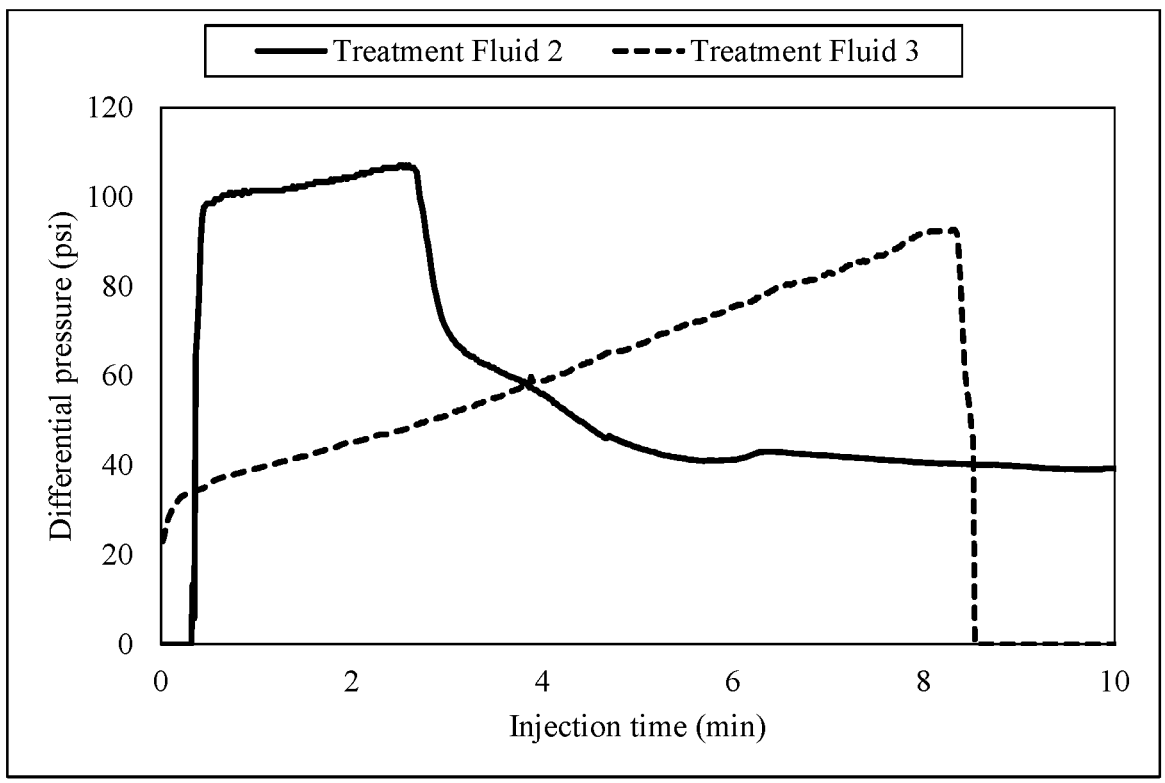
FIG. 3 illustrates pressure drop across core as measured during time of injection, in accordance with embodiments of the present disclosure.

Treatment fluids 2 and 3 were also examined using the core flow experiment. In this experiment, a cylindrical rock core (Desert Pink limestone, 1" diameter by 3" length) that represents a subterranean formation is held under radial pressure (1000 psi), axial pressure (300 psi) and elevated temperature (190° F.). A treatment fluid is injected into the core at a constant rate (1 ml/min). The formation dissolving agent reacts with the core, creating a conductive channel called a wormhole. The experiment continues until the wormhole extends from the injection face of the core to exit. The pressure drop across core is measured during injection, shown in FIG. 3 for treatment fluids 2 and 3. The earlier development of high viscosity at low spending extent characteristic of treatment 2 manifests itself in this experiment. The high viscosity immediately increases the differential pressure across the core (as dictated by Darcy's law). Similarly, the late development of high viscosity at high spending extent characteristic of treatment fluid 3 translates to a steady increase in differential pressure as the fluid slowly viscosities over the course of the experiment.

What is claimed is:

1. A method of treating a subterranean formation penetrated by a wellbore, comprising:
    injecting into said formation a treatment fluid comprising:
        at least one viscoelastic surfactant (VES) at a concentration between about 0.1 percent by weight and about 10 percent by weight;
        a formation-dissolving agent selected from the group consisting of hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, salts thereof, and mixtures thereof, and
        a rheology modifier comprising an aliphatic polyglycol ether and a metal salt;
    wherein, after the treatment fluid is injected into said formation, the rheology modifier changes the viscosity of the treatment fluid as a function of an extent of reaction between the formation-dissolving agent and said formation.

2. The method of claim 1, wherein said treatment fluid is a matrix acidizing fluid.
3. The method of claim 1, wherein said treatment fluid is an acid fracturing fluid.
4. The method of claim 1, wherein said treatment fluid is a diversion fluid.
5. The method of claim 1, wherein the at least one VES comprises a zwitterionic surfactant.
6. The method of claim 5, wherein said zwitterionic surfactant comprises a zwitterionic surfactant having the structure:

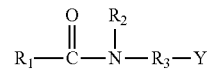

wherein $R_1$ is a hydrocarbyl group that is branched or straight chained, aromatic, aliphatic, or olefinic, comprises from 14 to 26 carbon atoms, and comprises an amine;
$R_2$ is hydrogen or an alkyl group having 1 to 4 carbon atoms;
$R_3$ is a hydrocarbyl group having from 1 to 5 carbon atoms; and
Y is an electron withdrawing group.

7. The method of claim 6, wherein said zwitterionic surfactant has the structure:

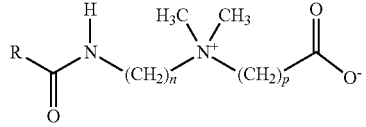

wherein R is a hydrocarbyl group that is branched or straight chained, aromatic, aliphatic, or olefinic; has from 14 to 26 carbon atoms; contains an amine; 2 to 4; and
p=1 to 5; and mixtures of these hydrocarbyl groups.

8. The method of claim 7, wherein R is $C_{17}H_{33}$, and n=3 and p=1.
9. The method of claim 7, wherein R is $C_{21}H_{41}$, and n=3 and p=1.
10. The method of claim 1, wherein the rheology modifier further comprises an anionic surfactant, a cationic surfactant, a nonionic surfactant, or a mixture thereof.
11. The method of claim 1, wherein the rheology modifier further comprises a polyacrylamide, a polystyrene, a polysiloxane, a poly(vinylalcohol), a guar, a functionalized guar derivative, a cellulose, or a mixture thereof.

* * * * *